(12) United States Patent
Dombray

(10) Patent No.: US 7,096,891 B2
(45) Date of Patent: Aug. 29, 2006

(54) APPARATUS FOR AUTOMATIC LAYING OF WIRE TIES

(75) Inventor: Freddy Dombray, Les Echelles (FR)

(73) Assignee: Papeteries Matussiere et Forest, (FR)

( * ) Notice: Subject to any disclaimer, the term of this patent is extended or adjusted under 35 U.S.C. 154(b) by 261 days.

(21) Appl. No.: 10/398,341

(22) PCT Filed: Oct. 4, 2001

(86) PCT No.: PCT/FR01/03065

§ 371 (c)(1),
(2), (4) Date: Aug. 5, 2003

(87) PCT Pub. No.: WO02/28167

PCT Pub. Date: Apr. 11, 2002

(65) Prior Publication Data

US 2004/0020550 A1    Feb. 5, 2004

(30) Foreign Application Priority Data

Oct. 4, 2000    (FR) .................................. 00 12681

(51) Int. Cl.
*B21F 15/04*    (2006.01)
(52) U.S. Cl. ......................... 140/119; 140/57; 140/93.6
(58) Field of Classification Search ............ 140/123.6, 140/119, 93.6, 57, 93 A
See application file for complete search history.

(56) References Cited

U.S. PATENT DOCUMENTS

| 4,362,192 | A | * | 12/1982 | Furlong et al. | 140/93.6 |
| 5,778,946 | A | * | 7/1998 | Pellenc et al. | 140/119 |
| 5,842,506 | A | * | 12/1998 | Peters | 140/119 |
| 5,944,064 | A | * | 8/1999 | Saito et al. | 140/119 |
| 6,488,055 | B1 | * | 12/2002 | Chen | 140/119 |

FOREIGN PATENT DOCUMENTS

| FR | 2 738 456 | 3/1997 |
| FR | 2 780 702 | 1/2000 |

* cited by examiner

*Primary Examiner*—Dmitry Suhol
(74) *Attorney, Agent, or Firm*—Cantor Colburn LLP

(57) ABSTRACT

The invention concerns an apparatus including a body equipped with means supplying a continuous wire, feeding said wire to a curved slot capable of being closed on itself, a twister driven in rotation during the process and a wire cutting device to form a tie. Said apparatus further comprises a first motor for driving the wire and for closing and opening the guide slot and a second motor for actuating the twister and the wire cutting device. Control means successively drive the wire and close the slot with the first motor, then, the first motor being switched off, simultaneously drive the wire cutting device and the twister with the second motor, and finally, after the second motor is switched off, open the slot and feed the latter with wire.

14 Claims, 5 Drawing Sheets

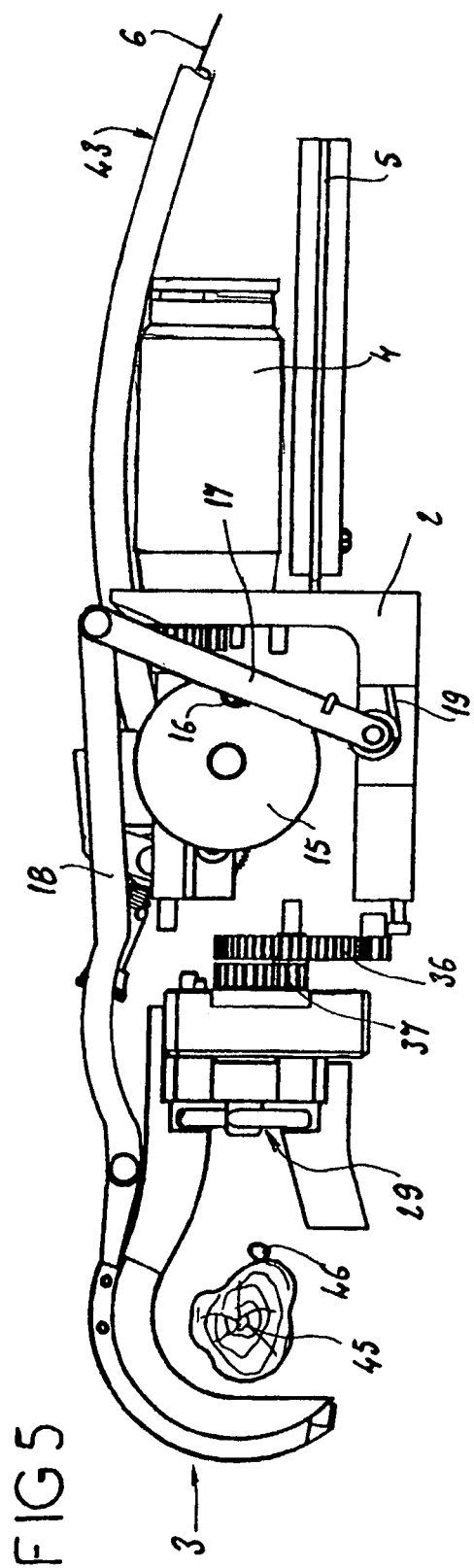
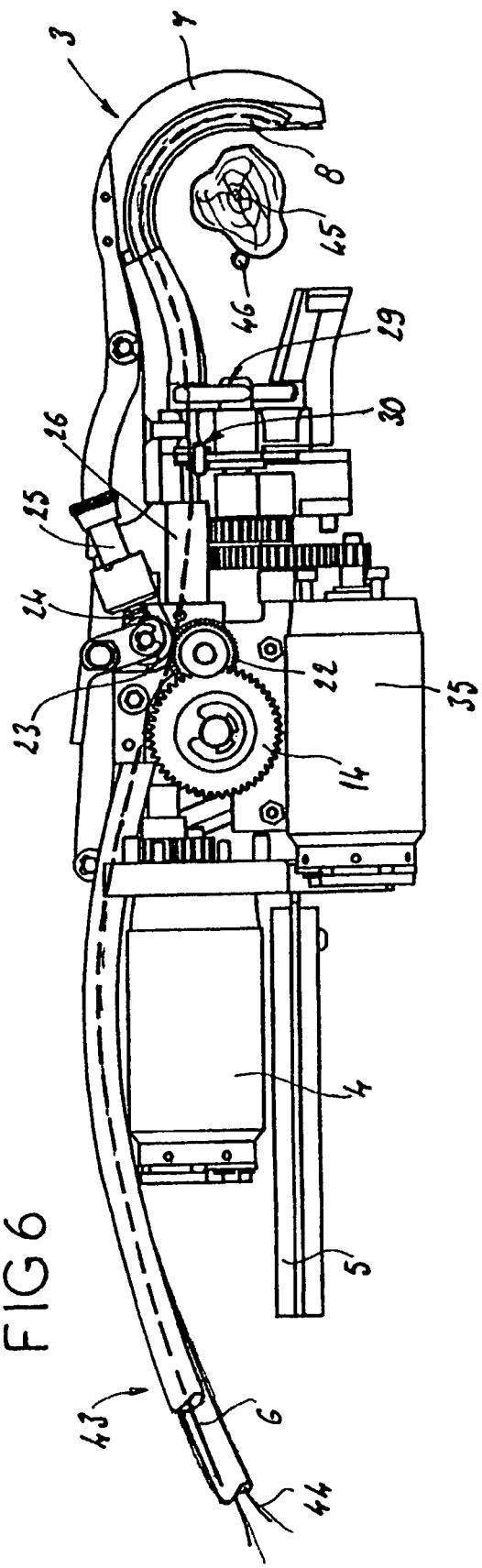

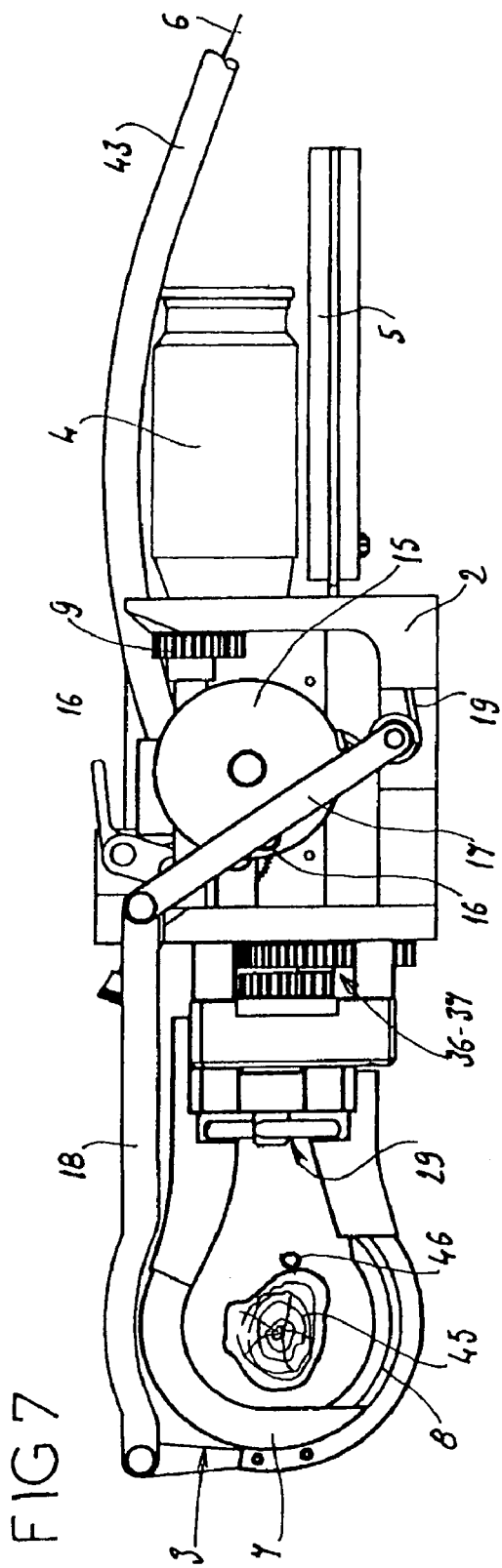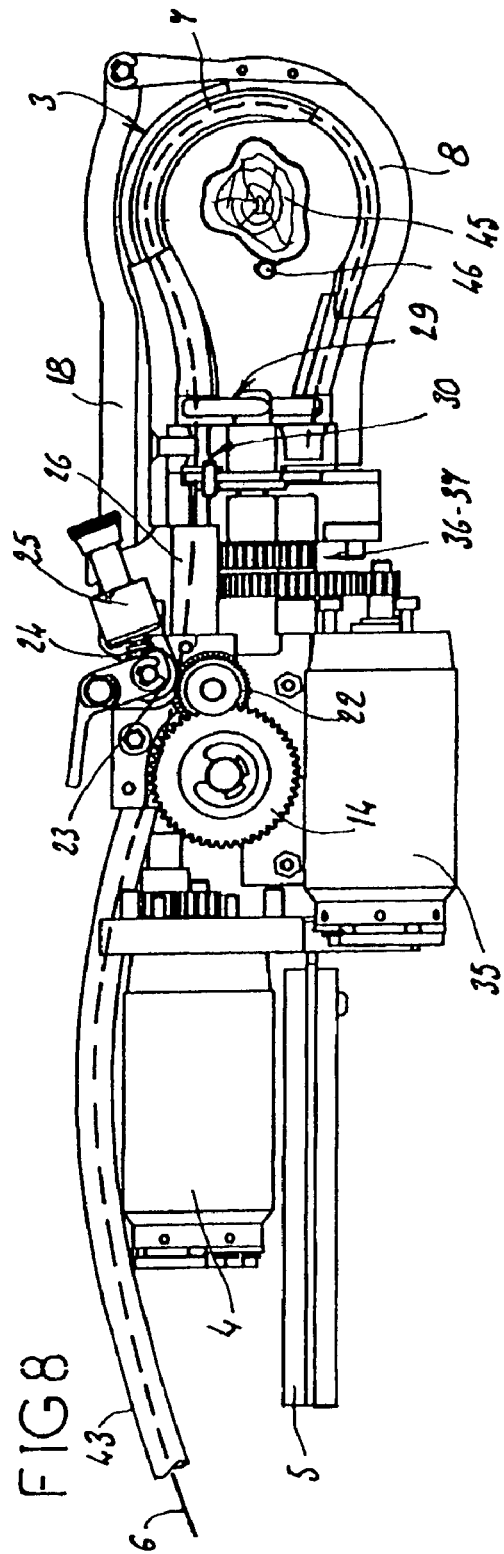

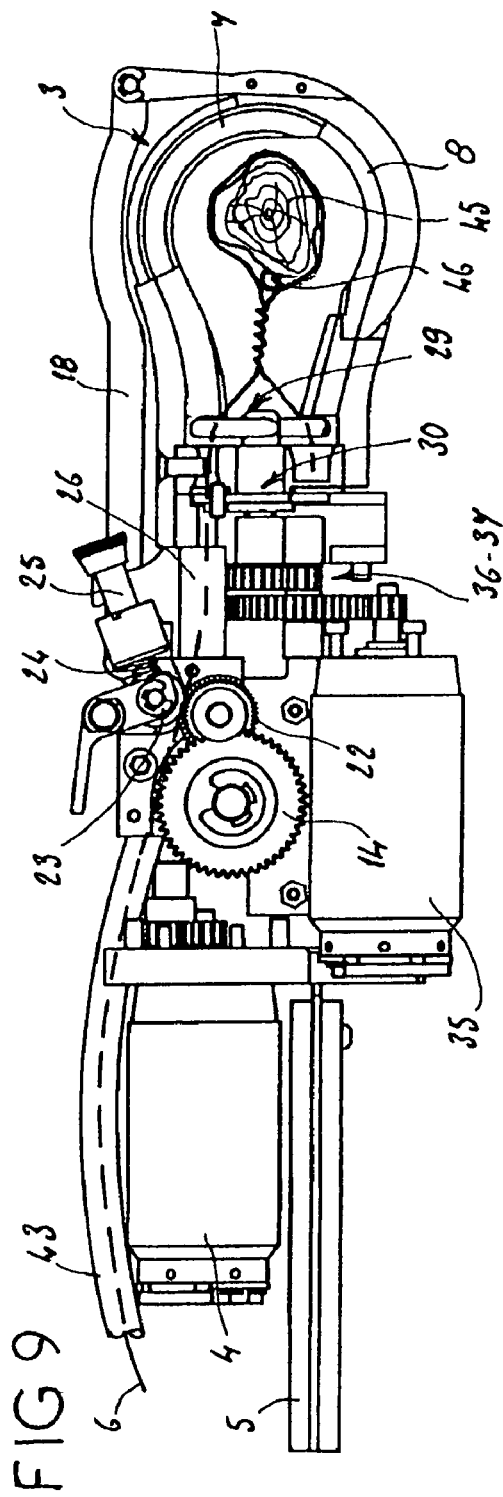
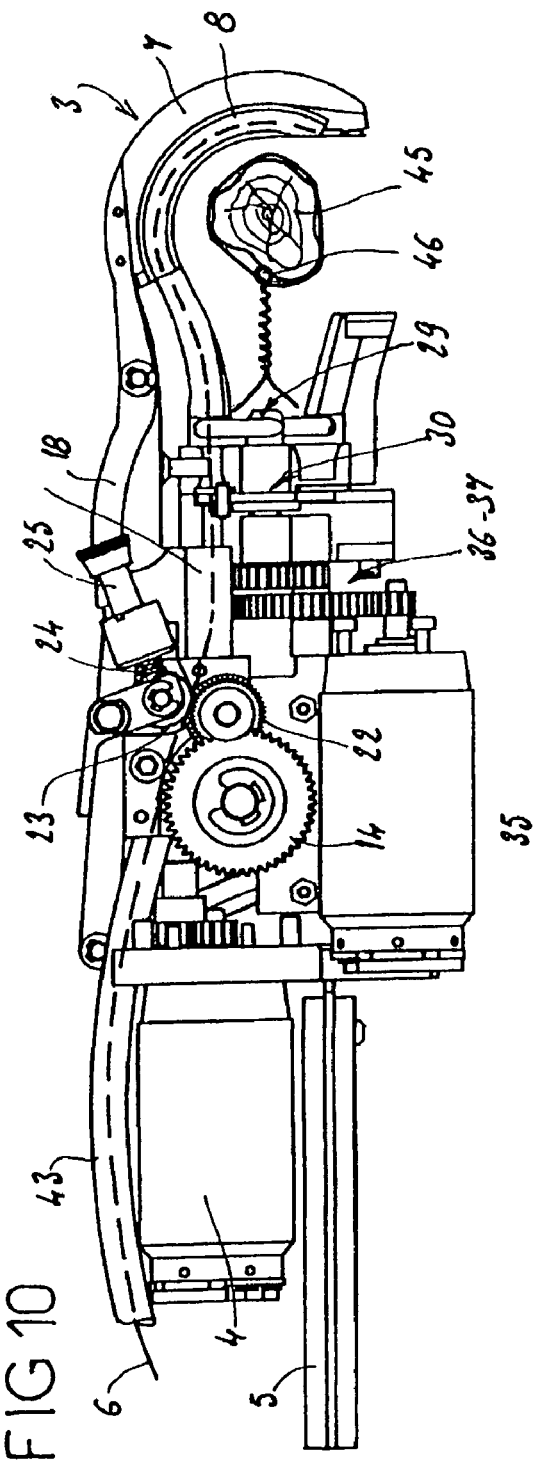
FIG 9
FIG 10

APPARATUS FOR AUTOMATIC LAYING OF WIRE TIES

TECHNICAL FIELD OF INVENTION

The subject of the present invention is an appliance for the automatic fitting of twisted ties, for example for the attachment of vine shoots or of plant branches to supports, such as stakes or training wires.

Each appliance may also be used for other applications, in particular industrial applications, requiring the tying of two pieces of small cross section, in particular of filamentary pieces.

BACKGROUND OF INVENTION

In the agricultural sector, it is often necessary to attach a plant to a support, in order to guide it as it grows. Thus, in particular, it is known to attach vine shoots, generally to horiontal wires called training wires. If this operation is carried out manually, it is lengthy and difficult, since it is necessary to cut wire portions from a reel, surround the shoot to be attached and also the wire to which it is to be attached, and then perform the twisting of the loop thus formed in order to ensure the closing of the latter.

To facilitate and speed up this tying operation, it was envisaged to produce appliances ensuring automatic fitting, that is to say comprising a body equipped with means for the feeding of continuous wire, for delivering this wire to a curved jaw capable of being reclosed on itself so as to surround the article or the like around which the tie is to be twisted, the body being equipped with a twister driven in rotation during the twisting operation and with a device for cutting the wire in order to form a tie. Such an appliance is described in the document FR 2 738 56. This appliance comprises a single motor ensuring the various functions of delivering the wire, of closing the jaw, of cutting a tie and of twisting the tie. However, the mechanism employed is complex, and the power available for each operation is not always sufficient in view of the use of a single motor.

SUMMARY OF THE INVENTION

The invention provides an appliance for the automatic fitting of twisted ties, which possesses excellent reliability and a high power for the performance of the various functions.

To this effect, the appliance to which it relates, of the abovementioned type, comprises a first motor intended for carrying out the drive of the wire and the closing and opening of the guide jaw, and a second motor intended for actuating the twister and the wire cutting device, control means being provided for successively controlling the drive of the wire and the closing of the jaw for guiding the latter, by means of the first motor, then, the first motor being stopped, the simultaneous drive of the wire cutting device and of the twister with the aid of the second motor, and, finally, after the stopping of the second motor, the opening of the guide jaw and the delivery of wire to the latter.

This appliance therefore comprises two electric motors, a first motor intended for carrying out simultaneously the drive of the wire and the closing of the guide jaw, the article to be secured being surrounded at the same time, and, in a second stroke and after the twisting of the tie, the reopening of the jaw and the delivery of wire up to level with the latter. The second motor, functioning after the closing of the jaw for guiding the wire, ensures the cutting and twisting of the wire around the article to be attached.

According to an advantageous characteristic of the invention, the jaw for guiding the wire comprises a first fixed part integral with the body and forming an open hook terminating in a zone in the form of an arc of a circle, in which is mounted in a sliding and guided manner a second part displaceable between a first position, in which the second part is retracted into the first part of the jaw, corresponding to an opening position of the latter, and a second position, in which the second part prolongs the first part of the jaw in order to form a closed loop encircling the article or the like around which the tie is to be twisted, a groove being formed on the inner face of the first and second parts of the jaw in order to ensure the guidance of the wire as far as the twister, after the formation of a loop.

It may be noted that, contrary to known appliances, the closing of the jaw around the article to be attached is not carried out by means of the pivoting of a movable part, but by means of the sliding of the movable part in the fixed part in order to execute an encircling movement. This jaw is consequently suitable for attaching articles of relatively large diameter, for example up to 30 mm, while matching the diameter of the article to be tied, attachment taking place without excessive clamping and without bruising the article, this being particularly important where plants are concerned.

In order to carry out the displacement of the movable part or second part of the jaw, that end of the second part of the jaw which remains guided in the first part of the jaw, in the closed position of the latter, has articulated on it one end of a first link which is arranged longitudinally to the body of the appliance and the other end of which is articulated on a second link likewise articulated on the body and subjected to the action of a spring tending to cause said second link to pivot and to displace the first link in a closing direction of the jaw.

In order to control the pivoting movement of the second link in the direction of a spring, the body has mounted on it pivotably about an axis parallel to the axis of articulation of the second link on the body a wheel which, driven in rotation by the first motor, is equipped, on one of its faces, with a cam coming to bear against the second link in order to control the pivoting of the latter and consequently the opening and closing movements of the jaw.

The wheel has keyed on it a first pinion for driving in rotation from an electric motor and a second pinion driving a pinion on which is keyed a roller for driving the wire, the wire passing between the driving roller and a roller of parallel axis, free in terms of rotation and subjected to the action of a compression spring, the latter roller performing the function of a pressing roller. There is a disengagement position, particularly during a period of prolonged nonuse of the appliance, making it possible to release the compression spring and prevent contact between the two rollers, the driving roller and the pressing roller, so as to avoid the risks of deformation attributable to prolonged bearing contact.

According to one embodiment of this appliance, that end of the body which is opposite that equipped with the jaw has mounted on it axially a first electric motor, the output shaft of which drives, by means of a pair of spur gears, a longitudinal shaft equipped with an endless screw meshing with a pinion keyed on the wheel. Transmission by means of an endless screws ensures a smoother drive of the wire and greater mechanical reliability than when gearwheels are used.

According to another characteristic of the invention, that part of the body which is located toward the jaw has mounted on it pivoting about an axis oriented in the axis of the body, that is to say perpendicular to the opening of the jaw, a shaft, on which are fastened the twister and a cutting device, the twister being located toward the jaw and the cutting device being located toward the interior of the body.

Advantageously, the twister consists of two bent and opposed arms in the form of a helix, and the cutting device is formed by two diametrically opposed blades, the cutting edges of which are located in front of the corresponding edges of the arms of the twister in the direction of rotation of the twister and of the cutting device. When the second motor is put into operation, one blade of the cutting device being located in front of the corresponding edge of one arm of the twister in the direction of rotation, the cutting of the wire is carried out in order to form the tie, before the start of twisting. Moreover, the shape of the twister is particularly suitable for obtaining an attachment which does not afford excessive clamping, this being advantageous where plants are concerned.

According to one characteristic of the invention, the second electric motor is mounted on the body in the central zone of the latter and drives the twister and the cutting device by means of two pairs of spur gears.

Advantageously, this appliance possesses an electronic card for the control of the electric motors, said card receiving information from three Hall-effect sensors, two of which are actuated by a magnet fastened to the wheel equipped with a cam and control respectively the stopping of the first motor and the putting into operation of the second motor, after the closing of the jaw and the stopping of the first motor at the end of the opening movement of the jaw, and the third of which is actuated by a magnet fastened to a drive gear of the shaft of the twister and of the cutting device and, at the end of the twisting operation, controls the stopping of the second motor and the putting into operation of the first motor.

It should be noted that, at the end of the twisting operation, the stopping of the second motor ensures the positioning of the shaft carrying the cutting device and the twister, in such a way that the cutting edge of a blade is located in front of the corresponding edge of the twister in the direction of rotation.

Advantageously, this appliance comprises a selector determining the number of revolutions of the twister during a twisting operation. With the aid of the selector, the operator defines the number of revolutions necessary for carrying out the twisting of the tie, then exerts a pressure on a contact button which triggers the sequence of operations carrying out tying.

In view of the arrangement of the various component members, the appliance possesses an elongate general shape and takes the form of a rod. This form is particularly ergonomic, since, under conditions of use, it limits the movements of the wrist, thus avoiding problems of traumatism of the hand and of the forearm.

According to another characteristic of the invention, this appliance comprises a double sheath for the delivery of the tying wire and of the electrical energy for the motors. This arrangement makes it possible to use the appliance, whatever the climatic conditions, since the wire is protected from moisture. Moreover, the training operation is facilitated, since the wire is delivered positively and is not pulled by the user. This protection of the wire prevents the entanglement of the tying wire and of the energy delivery wires and also the catching of the wire in branches. Finally, this arrangement protects the machine with respect to the introduction of materials, such as earth, dust, wood or leaves, which would risk being caught on the wires, thus increasing the reliability and useful life of the appliance.

According to another characteristic of this appliance, the latter comprises a device for recognizing the wire used, thus preventing the functioning of the appliance if the wire is not recognized as being compatible with the functioning of the appliance. This recognition of the wire used avoids the employment of wires which would not be suitable for the appliance and which would be detrimental to its functioning or would even risk damaging it.

BRIEF DESCRIPTION OF DRAWINGS

In any event, the invention will be understood clearly from the following description, with reference to the accompanying diagrammatic drawing which illustrates, by way of nonlimiting example, one embodiment of this appliance and in which:

FIGS. 5 and 6 are two side views of the appliance in the open position, after engagement on an article to be tied to a support;

FIGS. 7 and 8 are two side views similar to FIGS. 5 and 6, respectively after the closing of the jaw and before the twisting operation;

FIGS. 9 and 10 are two side views similar to FIG. 8, respectively during the twisting operation, after this operation and after the opening of the jaw.

DETAILED DESCRIPTION OF INVENTION

Figure 1:
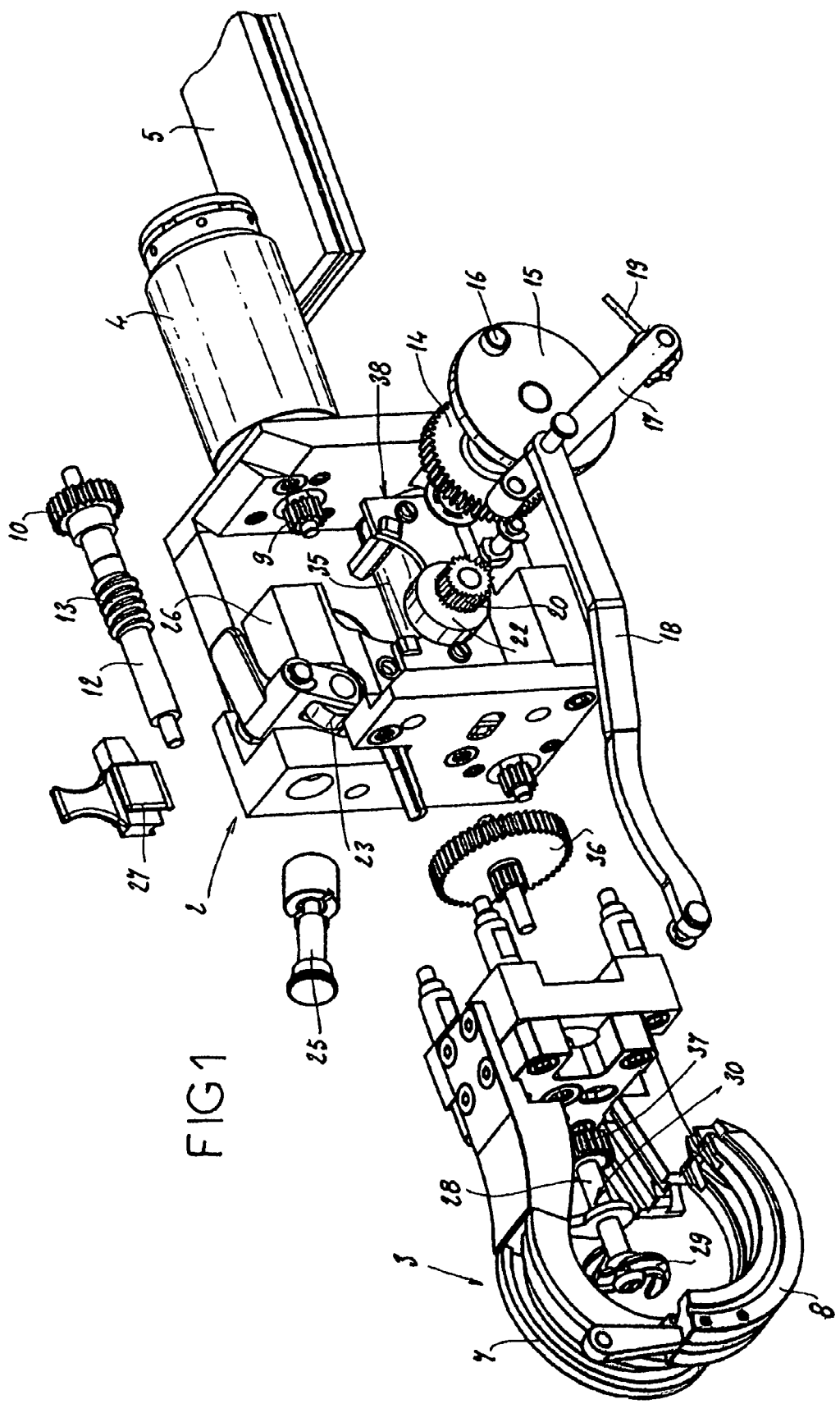
FIG. 1 is a perspective view of the main components of this appliance in an exploded view, the hood which covers these various components not being illustrated.

The appliance according to the invention comprises a body 2, on the front part of which is mounted a subassembly comprising a jaw 3 intended to surround the article to be attached and also the support to which this article is to be attached, and to the rear part of which are fastened a motor 4 and an electronic card 5. The assembly therefore has an elongate shape intended to be covered by a hood having the general form of a rod, which is particularly ergonomic for the user. The tying wire 6 is supplied continuously from the rear of the body, passes through the body, at the same time being driven in the region of the latter, and is delivered to the region of the jaw.

The jaw for guiding the wire comprises a first fixed part 7 integral with the body and forming an open hook terminating in a zone in the form of an arc of a circle, in which is mounted in a sliding and guided manner according to this arc of a circle a second part 8 displaceable between a first position, in which the second part 8 is retracted into the first part 7 of the jaw, corresponding to an opening position illustrated particularly in FIGS. 5 and 6, and a second position, in which the second part 8 prolongs the first part 7 of the jaw, in order to form a closed loop encircling the article or the like around which the tie is to be twisted. A groove, not illustrated in the drawing, is formed on the inner face of the first and second parts 7, 8 of the jaw 3 in order to ensure the guidance of the wire 6 as far as the twister, after the formation of a loop.

The first motor 4 drives, by means of a pair of gears 9, 10, a longitudinal shaft 12 equipped with an endless screw 13.

This shaft 12 is mounted pivotably in bearings formed in the body 2. The endless screw 13 meshes with a pinion 14. A wheel 15 equipped with a cam 16 is keyed on this pinion 14. The body has articulated on it, about an axis parallel to that of the wheel and at one of its ends, a link 17, on the other end of which is articulated one end of a link 18, the other end of which is articulated on the second part 8 of the jaw 3. A torsion spring 19 acts on the link 17 and consequently on the link 18 in order to cause the closing of the jaw 3. The cam 16 of the wheel 15 cooperates with the link 17 in order to control the tilting movement of the latter toward the closing position of the jaw, and to draw the link 17 into the opening position of the jaw.

Figure 2:
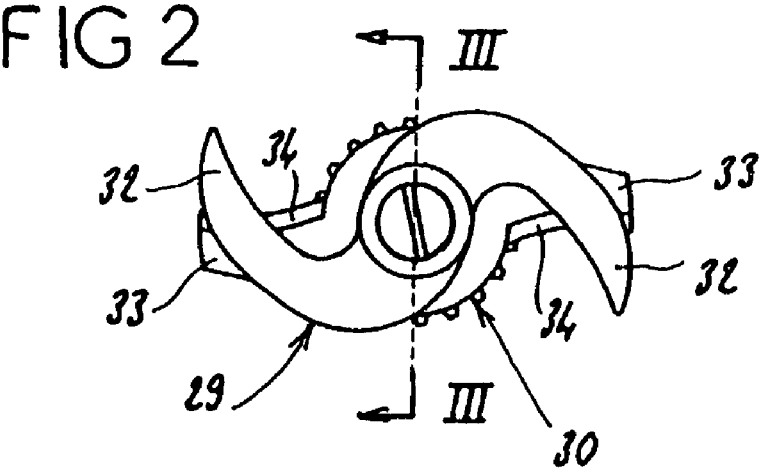
FIG. 2 is a front view of the shaft carrying the twister and the wire cutting device.
Figure 3:
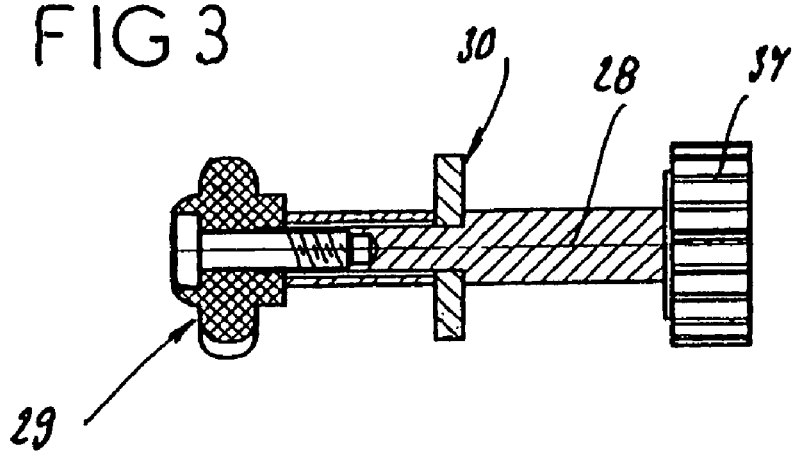
FIG. 3 is a view in longitudinal section of this same shaft along the line III—III of FIG. 2.
Figure 4:
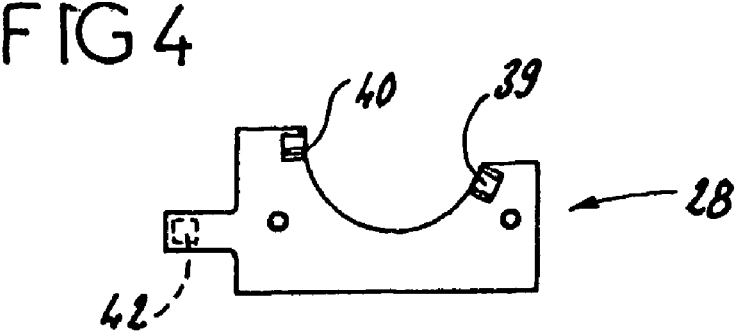
FIG. 4 is a detail view of a card carrying sensors.

The pinion 14 meshes with a pinion 20, on which is keyed a roller 22 for driving the wire 6. The wire passes between the driving roller 22 and a pressing roller 23 subjected to the action of a compression spring 24. There is a disengagement device 25 making it possible, under conditions of prolonged nonuse of the appliance, to disengage the bearing contact of the pressing roller 23 against the driving roller 22, in order to avoid marking the two rollers as a result of prolonged punctiform bearing contact of one on the other. As shown particularly in FIG. 1, the body is equipped with a wire guide 26, the passage of the wire being accessible with the aid of an intervention flap 27. Mounted in front of the body 2 axially, that is to say perpendicularly to the opening of the jaw, is a shaft 28, on which are keyed a twister 29 and a device 30 for cutting the wire. As shown particularly in FIG. 2, the twister 29 consists of two bent and opposed arms 32 in the form of a helix, and the cutting device is formed by two diametrically opposed blades 33, the cutting edges 34 of which are located in front of the corresponding edges of the arms of the twister in the direction of rotation of the twister and the cutting device.

The drive of the shaft 28, equipped with the twister and the cutting device, is carried out from a second electric motor 35 by means of two pairs of spur gears 36, 37. The appliance is equipped with a card 38 carrying three Hall-effect sensors designated respectively by the references 39, 40 and 42. The wheel 15 is equipped with a magnet, the displacement path of which passes in front of the sensors 39 and 40, while the gear 36 is equipped with a magnet, the displacement path of which passes in front of the sensor 42.

During the passage of the magnet associated with the wheel 15, the sensor 40 controls the stopping of the first motor 4 and the putting into operation of the second motor 35, after the closing of the jaw 3. The second sensor 39 controls the stopping of the first motor 4 at the end of the opening movement of the jaw 3. At the end of the twisting operation, the third sensor 42 controls the stopping of the second motor 35 and the putting into operation of the first motor 4. It should be noted that, when the appliance functions, the two motors 4 and 35 always rotate in the same direction.

The appliance is equipped with a selector, not illustrated in the drawing, making it possible to set the number of revolutions of the twister during an operation, prior to a twisting operation.

Finally, as shown diagrammatically in FIG. 6, the appliance is equipped with a double sheath 43 ensuring, on the one hand, the delivery of the wire 6 and, on the other hand, the delivery of the electrical supply 44.

The appliance functions as follows. Depending on the type of article to be attached, the operator selects the number of twisting revolutions. As shown in FIGS. 5 and 6, the operator engages the jaw in the open position around the article 45 to be attached to a support 46. The cycle control trigger, not illustrated in the drawing, is actuated. The electronic card 5 supplies a pulse to the motor 4 which comes into operation. The motor drives the shaft 12 and consequently the wheel 15 and the driving roller 22.

The cam 16 releases the link 17, retained up to then, thus ensuring the closing of the jaw 3 as a result of the displacement of the movable part 8 in relation to the fixed part 7.

The roller 22 for driving the wire rotates and causes the wire to advance into the jaw 3, until the latter is engaged in the twister 29.

The motor 4 rotates until the magnet of the wheel 15 comes into position opposite the sensor 40. The sensor informs the card 5 that the motor 4 is to be stopped and that the motor 35 is to be put into operation.

The appliance is then in the position illustrated in FIGS. 7 and 8.

The motor 35 drives the shaft 28 carrying the twister 29 and the cutting blade 30.

The cutting blade 30, in cooperation with a bedknife, severs the wire, and then the wings 32 of the twister catch the two strands of the wire in order to carry out twisting, as shown in FIG. 9.

The twister executes the number of revolutions defined by the user with the aid of the selector. When the sensor 42 has counted the number of revolutions predetermined by the passage of the magnet fastened to the pinion 36, said sensor stops the motor 35, at the same time ensuring an exact positioning of the twister and of the cutting device for the purpose of starting the next cycle. The information supplied to the electronic card 5 likewise ensures that the motor 4 is put into operation, still in the same direction, the wheel 15 ensuring, by means of the cam 16, the drive of the link 17 in an opening direction of the jaw 3, as shown in FIG. 10. This rotational movement of the wheel 15 is stopped when the magnet which the latter comprises comes opposite the sensor 39. It should be noted that, during this opening movement of the jaw, the wire is driven by the driving roller 22, until, when the motor 4 stops the movement of the latter, said wire reaches the end of the jaw 3.

The appliance is then ready for another cycle.

It is possible to act on the appliance, should the wire no longer pass through the guide channel 26. This action is carried out by means of the flap 27 provided for this purpose.

As may be gathered from the foregoing, the invention affords a great improvement to the existing technique by providing an appliance of simple and reliable structure which has great convenience for the operator in terms of use.

What is claimed is:

1. An appliance for the automatic fitting of twisted ties on an article, comprising:
   a body;
   means for driving continuous wire;
   a jaw capable of being reclosed on itself so as to surround the article, the wire being said driven to the curved jaw and guided thereby;
   a twister driven in rotation during a twisting operation;
   a device for cutting the wire in order to form a tie;
   a first motor for carrying out the driving of the wire and closing and opening of the jaw;
   a second motor for actuating the twister and the wire cutting device; and
   control means for successively controlling the driving of the wire and the closing of the jaw, by means of the first motor, a stopping of the first motor and a simultaneous driving of the wire cutting device and of the twister by the second motor a stopping of the second motor, and opening of the jaw and delivery of the wire to the jaw.

2. The appliance as claimed in claim 1, wherein the jaw for guiding the wire comprises a first fixed part integral with the body and forming an open hook terminating in a zone substantially in a form of an arc of a circle, a second part mounted in a sliding and guided manner on the first part, the second part being displaceable between a first position, in which the second part is retracted into the first part, corresponding to an opening position of the jaw, and a second position, in which the second part prolongs the first part, in order to form a closed loop encircling the article, and a groove formed on an inner face of the first and second parts of the jaw in order to ensure the guidance of the wire as far as the twister after the formation of a loop.

3. The appliance as claimed in claim 2, wherein an end of the second part which remains guided in the first part, in the closed position of the jaw, includes articulated thereon one end of a first link which is arranged longitudinally to the body and another end of the first link articulated on a second link articulated on the body and subjected to action of a spring causing said second link to pivot and to displace the first link in a closing direction of the jaw.

4. The appliance as claimed in claim 3, wherein the body includes a wheel mounted thereon pivoting about an axis parallel to an axis of articulation of the second link which is driven in rotation by the first motor and includes on one face a cam coming to bear against the second link in order to control the pivoting of the second link and the opening and closing movements of the jaw.

5. The appliance as claimed in claim 4, wherein the wheel includes a first pinion keyed thereon for driving in rotation from an electric motor which likewise drives a second pinion, on which is keyed a driving roller for driving the wire, the wire passing between the driving roller and a pressing roller of parallel axis, free in terms of rotation and subjected to the action of a compression spring.

6. The appliance as claimed in claim 5, wherein an end of the body which is opposite the jaw has mounted on it axially the first motor, an output shaft of which drives, by means of a pair of spur gears, a longitudinal shaft equipped with an endless screw meshing with the first pinion keyed on the wheel.

7. The appliance as claimed in claim 1, wherein a portion of the body located toward the jaw has mounted on it perpendicular to an opening of the jaw, a shaft, on which are keyed the twister and the cutting device, the twister being located toward the jaw and the cutting device being located toward an interior of the body.

8. The appliance as claimed in claim 7, wherein the twister includes of two bent and opposed arms substantially in the form of a helix and the cutting device includes two diametrically opposed blades cutting edges of which are located in front of corresponding edges of the arms of the twister in a direction of rotation of the twister and of the cutting device.

9. The appliance as claimed in claim 7, further comprising an electronic card for the control of the electric motors, said card receiving information from three Hall—effect sensors, two of which are actuated by a magnet fastened to a wheel equipped with a cam and control the stopping of the first motor and a starting of the second motor, after the closing of the jaw and the stopping of the first motor at the end of the opening movement of the jaw, and third sensor being actuated by a magnet fastened to a drive gear of the shaft of the twister and of the cutting device and, at the end of the twisting operation, controls the stopping of the second motor and the starting of the first motor.

10. The appliance as claimed in claim 9, further comprising a selector determining the number of revolutions of the twister during a twisting operation.

11. The appliance as claimed in claim 1, wherein the second electric motor is mounted on the body in a central zone of the body and drives the twister and the cutting device by means of two pairs of spur gears.

12. The appliance as claimed in claim 1 comprising an elongate general shape and including a form of a rod.

13. The appliance as claimed in claim 1, further comprising a double sheath for the delivery of the wire and of the electrical energy for the motors.

14. The appliance as claimed in claim 1 further comprising a device for recognizing the wire used and for preventing the functioning of the appliance if the wire is not recognized as being compatible with the functioning of the appliance.

* * * * *